US012769886B2

(12) United States Patent
Thomas

(10) Patent No.: US 12,769,886 B2
(45) **Date of Patent: *Oct. 20, 2026**

(54) CONTROLLING ACCESS TO RESTRICTED AND UNRESTRICTED SOFTWARE FUNCTIONALITY

(71) Applicant: QUALCOMM Incorporated, San Diego, CA (US)

(72) Inventor: Gordon Thomas, Encinitas, CA (US)

(73) Assignee: QUALCOMM Incorporated, San Diego, CA (US)

(*) Notice: Subject to any disclaimer, the term of this patent is extended or adjusted under 35 U.S.C. 154(b) by 58 days.

This patent is subject to a terminal disclaimer.

(21) Appl. No.: 19/035,684

(22) Filed: Jan. 23, 2025

(65) Prior Publication Data

US 2025/0245386 A1 Jul. 31, 2025

Related U.S. Application Data

(63) Continuation of application No. 17/813,550, filed on Jul. 19, 2022, now Pat. No. 12,210,655.

(51) Int. Cl.
*G06F 21/62* (2013.01)
*G06F 3/0484* (2022.01)
*G06F 21/32* (2013.01)

(52) U.S. Cl.
CPC .......... *G06F 21/629* (2013.01); *G06F 3/0484* (2013.01); *G06F 21/32* (2013.01)

(58) Field of Classification Search
CPC ....... G06F 21/629; G06F 3/0484; G06F 21/32
See application file for complete search history.

(56) References Cited

U.S. PATENT DOCUMENTS 10,021,232 B2 7/2018 Yoon et al.
10,262,322 B2 * 4/2019 Lee ........................ G06V 40/13
(Continued)

FOREIGN PATENT DOCUMENTS

EP 2421236 A2 2/2012
EP 3182314 A1 6/2017

OTHER PUBLICATIONS

Ahsan M., et al., "Smart Monitoring and Controlling of Appliances Using LoRa Based IoT System", Designs 2021, 5(1), Mar. 9, 2021, pp. 1-22, URL: https://doi.org/10.3390/designs5010017.
(Continued)

*Primary Examiner* — Viral S Lakhia
(74) *Attorney, Agent, or Firm* — QUALCOMM Incorporated

(57) ABSTRACT

Some disclosed methods involve controlling a display system to present one or more restricted access virtual buttons in a secure region. The restricted access virtual buttons may correspond to functionality of the apparatus or functionality of a software application for which access is restricted. Some disclosed methods involve controlling the display system to present one or more unrestricted access virtual buttons in a non-secure region. The unrestricted access virtual buttons may correspond to functionality of the apparatus or functionality of the software application for which access is not restricted. Responsive to the selection of a virtual button displayed in the secure region, some methods involve performing an authentication process and executing the functionality of the device or functionality of a software application for which access is restricted after successful authentication. Access to functionality corresponding to the restricted access virtual buttons may be prevented if the authentication process is not successful.

20 Claims, 7 Drawing Sheets

(56) References Cited

U.S. PATENT DOCUMENTS

| | | | | |
|---|---|---|---|---|
| 10,484,384 | B2 | 11/2019 | Cotterill | |
| 10,673,844 | B2 * | 6/2020 | Wolf | G06F 21/31 |
| 10,740,481 | B2 * | 8/2020 | Lakhani | G06F 21/44 |
| 10,956,550 | B2 * | 3/2021 | Fadell | H04W 12/068 |
| 11,093,648 | B2 | 8/2021 | Divakaran et al. | |
| 11,102,251 | B1 | 8/2021 | Pettit et al. | |
| 11,334,258 | B2 | 5/2022 | Sundararaman et al. | |
| 11,385,770 | B1 | 7/2022 | Raidu et al. | |
| 11,783,062 | B2 | 10/2023 | Lounsberry | |
| 11,823,481 | B2 | 11/2023 | Dhindhsa et al. | |
| 12,015,918 | B2 * | 6/2024 | Manepalli | G06Q 40/02 |
| 12,045,630 | B2 | 7/2024 | McDonald et al. | |
| 12,210,655 | B2 | 1/2025 | Thomas | |
| 12,212,967 | B2 * | 1/2025 | Sunfeer | G06F 21/62 |
| 2015/0153889 | A1 | 6/2015 | Vanblon et al. | |
| 2015/0186661 | A1 | 7/2015 | Hirase | |
| 2017/0264818 | A1 | 9/2017 | Liao | |
| 2019/0018461 | A1 | 1/2019 | DeBates et al. | |
| 2020/0265418 | A1 | 8/2020 | Lee et al. | |
| 2020/0401292 | A1 | 12/2020 | Lorenz et al. | |
| 2022/0114244 | A1 | 4/2022 | Richman et al. | |
| 2023/0306109 | A1 | 9/2023 | Lowenhardt et al. | |
| 2023/0370334 | A1 | 11/2023 | Mannengal et al. | |
| 2023/0370452 | A1 | 11/2023 | Mannengal et al. | |

OTHER PUBLICATIONS

International Search Report and Written Opinion—PCT/US2023/067944—ISA/EPO—Sep. 21, 2023.

* cited by examiner

CONTROLLING ACCESS TO RESTRICTED AND UNRESTRICTED SOFTWARE FUNCTIONALITY

PRIORITY CLAIM

This application claims priority to, and is a continuation of, U.S. patent application Ser. No. 17/813,550, entitled "CONTROLLING ACCESS TO RESTRICTED AND UNRESTRICTED SOFTWARE FUNCTIONALITY" and filed on Jul. 19, 2022, which is hereby incorporated by reference and for all purposes.

TECHNICAL FIELD

This disclosure relates generally to methods, apparatus and systems for controlling access to software functionality.

DESCRIPTION OF THE RELATED TECHNOLOGY

Software applications or "apps" are commonly accessed by interacting with virtual buttons (also known as icons) displayed on a device. An app may allow access to one or more types of software functionality, for example through the use of icons or virtual buttons depicted by images within the app itself. Although methods, devices and systems exist for controlling access to software functionality, improved methods, devices and systems would be desirable.

SUMMARY

The systems, methods and devices of the disclosure each have several innovative aspects, no single one of which is solely responsible for the desirable attributes disclosed herein.

One or more innovative aspects of the subject matter described in this disclosure may be implemented in a method. In some examples, the method may involve controlling, by a control system, a display system to present one or more restricted access virtual buttons in a secure region. The restricted access virtual buttons may correspond to functionality of the device or functionality of a software application for which access is restricted. In some examples, the method may involve controlling, by the control system, the display system to present one or more unrestricted access virtual buttons in a non-secure region. The non-secure region may, in some examples, be separate from the secure region. The unrestricted access virtual buttons may correspond to functionality of the device or functionality of the software application for which access is not restricted.

In some examples, the method may involve, responsive to the selection of a virtual button displayed in the secure region, performing an authentication process and executing the functionality of the device or functionality of a software application for which access is restricted after successful authentication. According to some examples, access to functionality corresponding to the restricted access virtual buttons may be prevented if the authentication process is not successful. In some examples, the secure region may correspond to a fingerprint sensor area and the authentication process may be a fingerprint authentication process. Alternatively, or additionally, the authentication process may involve a retinal scan or a gesture detection process.

According to some examples, the restricted access virtual buttons may correspond to functionality of the device or functionality of the software application for which access is restricted when the device is in a secure state or when the software application has been initialized. In some such examples, the secure state may correspond to a locked or sleep condition.

In some examples, the method may involve controlling, by the control system, the display system to present the secure region differently from the non-secure region. In some examples, the secure region may be presented on a first display of the display system and the non-secure region may be presented on a second display of the display system.

According to some examples, the method may involve, in response to the selection of a virtual button displayed in the non-secure region, executing the functionality of the device or functionality of a software application for which access is not restricted without authentication.

Other innovative aspects of the subject matter described in this disclosure may be implemented in an apparatus. According to some examples, the apparatus may be integrated into a mobile device. In some examples, the apparatus may include a display system including one or more displays, a biometric authentication system and a control system configured for communication with (such as electrically or wirelessly coupled to) the display system and the biometric authentication system. In some examples, the control system may include a memory, whereas in other examples the control system may be configured for communication with a memory that is not part of the control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some examples, the control system may be configured to control the display system to present one or more restricted access virtual buttons in a secure region. The restricted access virtual buttons may correspond to functionality of the apparatus or functionality of a software application for which access is restricted. In some examples, the control system may be configured to control the display system to present one or more unrestricted access virtual buttons in a non-secure region. The non-secure region may be separate from the secure region. The unrestricted access virtual buttons may correspond to functionality of the apparatus or functionality of the software application for which access is not restricted. In some examples, responsive to the selection of a virtual button displayed in the secure region, the control system may be configured to control the biometric authentication system to perform an authentication process. If the authentication process is successful, the control system may be configured to execute the functionality of the device or functionality of a software application for which access is restricted. If the authentication process is not successful, the control system may be configured to prevent executing the functionality of the device or functionality of a software application for which access is restricted.

In some implementations, the restricted access virtual buttons may correspond to functionality of the apparatus or functionality of the software application for which the access is restricted when the apparatus is in a secure state. The secure state may, for example, correspond to a locked condition or a sleep condition. In some implementations, the restricted access virtual buttons may correspond to functionality of the apparatus or functionality of the software application for which the access is restricted when the software application has been initialized.

According to some implementations, the secure region may correspond to a biometric authentication system area of the biometric authentication system. In some implementations, the biometric authentication system may include a fingerprint sensor system. In some such implementations, the secure region may correspond to a fingerprint sensor area of the fingerprint sensor system. In some such implementations, the authentication process may involve a fingerprint authentication process. Alternatively, or additionally, in some implementations the authentication process may involve a retinal scan or a gesture detection process.

In some examples, responsive to the selection of a virtual button displayed in the non-secure region, the control system may be configured to execute the functionality of the device or functionality of a software application for which access is not restricted without authentication.

In some examples, the control system may be configured to control the display system to present the secure region differently from the non-secure region. According to some examples, the control system may be configured to present the secure region on a first display of the display system and to present the non-secure region on a second display of the display system.

Some or all of the operations, functions or methods described herein may be performed by one or more devices according to instructions (such as software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon. For example, the software may include instructions for controlling one or more devices to perform a method. In some examples, the method may involve controlling, by a control system of the apparatus, a display system of the apparatus to present one or more restricted access virtual buttons in a secure region. The restricted access virtual buttons may correspond to functionality of the apparatus or functionality of a software application for which access is restricted. In some examples, the method may involve controlling, by the control system, the display system to present one or more unrestricted access virtual buttons in a non-secure region. The non-secure region may be separate from the secure region. The unrestricted access virtual buttons may correspond to functionality of the apparatus or functionality of the software application for which access is not restricted. In some examples, the method may involve, responsive to the selection of a virtual button displayed in the secure region, performing an authentication process and executing the functionality of the device or functionality of a software application for which access is restricted after successful authentication. In some examples, the secure region may correspond to a fingerprint sensor area.

According to some examples, access to functionality corresponding to the restricted access virtual buttons may be prevented if the authentication process is not successful. In some examples, the method may involve, in response to the selection of a virtual button displayed in the non-secure region, executing the functionality of the device or functionality of a software application for which access is not restricted without authentication.

Yet other innovative aspects of the subject matter described in this disclosure may be implemented in an alternative method. According to some examples, the method may involve developing a graphical user interface for a software application.

In some examples, the method may involve controlling, by a control system, a display system to present a secure region prompt to define a secure region of the graphical user interface. In some examples, the method may involve receiving, by the control system and via an interface system, secure region information defining the secure region. According to some examples, the secure region information may correspond to a fingerprint sensor area.

In some examples, the method may involve controlling, by a control system, the display system to present a restricted access virtual button prompt to define one or more restricted access virtual buttons to be displayed in the secure region. In some examples, the method may involve receiving, by the control system and via the interface system, restricted access virtual button information corresponding to one or more restricted access virtual buttons to be displayed in the secure region. In some examples, the method may involve configuring the graphical user interface according to the secure region information and the restricted access virtual button information. In some examples, the graphical user interface may be for a software application designed to run on a mobile device.

In some examples, the method may involve controlling, by a control system, the display system to present an unrestricted access virtual button prompt to define one or more unrestricted access virtual buttons to be displayed outside of the secure region. According to some examples, the method may involve receiving, by the control system and via the interface system, unrestricted access virtual button information corresponding to one or more unrestricted access virtual buttons to be displayed outside of the secure region. In some examples, the method may involve configuring the graphical user interface according to the unrestricted access virtual button information.

Other innovative aspects of the subject matter described in this disclosure may be implemented according to instructions (such as software) stored on one or more non-transitory media. In some examples, the method may involve controlling, by a control system of the apparatus, a display system of the apparatus to present a secure region prompt to define a secure region of the graphical user interface. In some examples, the method may involve receiving, by the control system and via an interface system of the apparatus, secure region information defining the secure region. In some examples, the method may involve controlling, by a control system, the display system to present a restricted access virtual button prompt to define one or more restricted access virtual buttons to be displayed in the secure region. In some examples, the method may involve receiving, by the control system and via the interface system, restricted access virtual button information corresponding to one or more restricted access virtual buttons to be displayed in the secure region. In some examples, the method may involve configuring the graphical user interface according to the secure region information and the restricted access virtual button information.

In some examples, the graphical user interface may be for a software application designed to run on a mobile device. According to some examples, the secure region information may correspond to a fingerprint sensor area.

In some examples, the method may involve controlling, by a control system, the display system to present an unrestricted access virtual button prompt to define one or more unrestricted access virtual buttons to be displayed outside of the secure region. According to some examples, the method may involve receiving, by the control system and via the interface system, unrestricted access virtual button information corresponding to one or more unrestricted access virtual buttons to be displayed outside of the secure region. In some examples, the method may involve configuring the graphical user interface according to the unrestricted access virtual button information.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
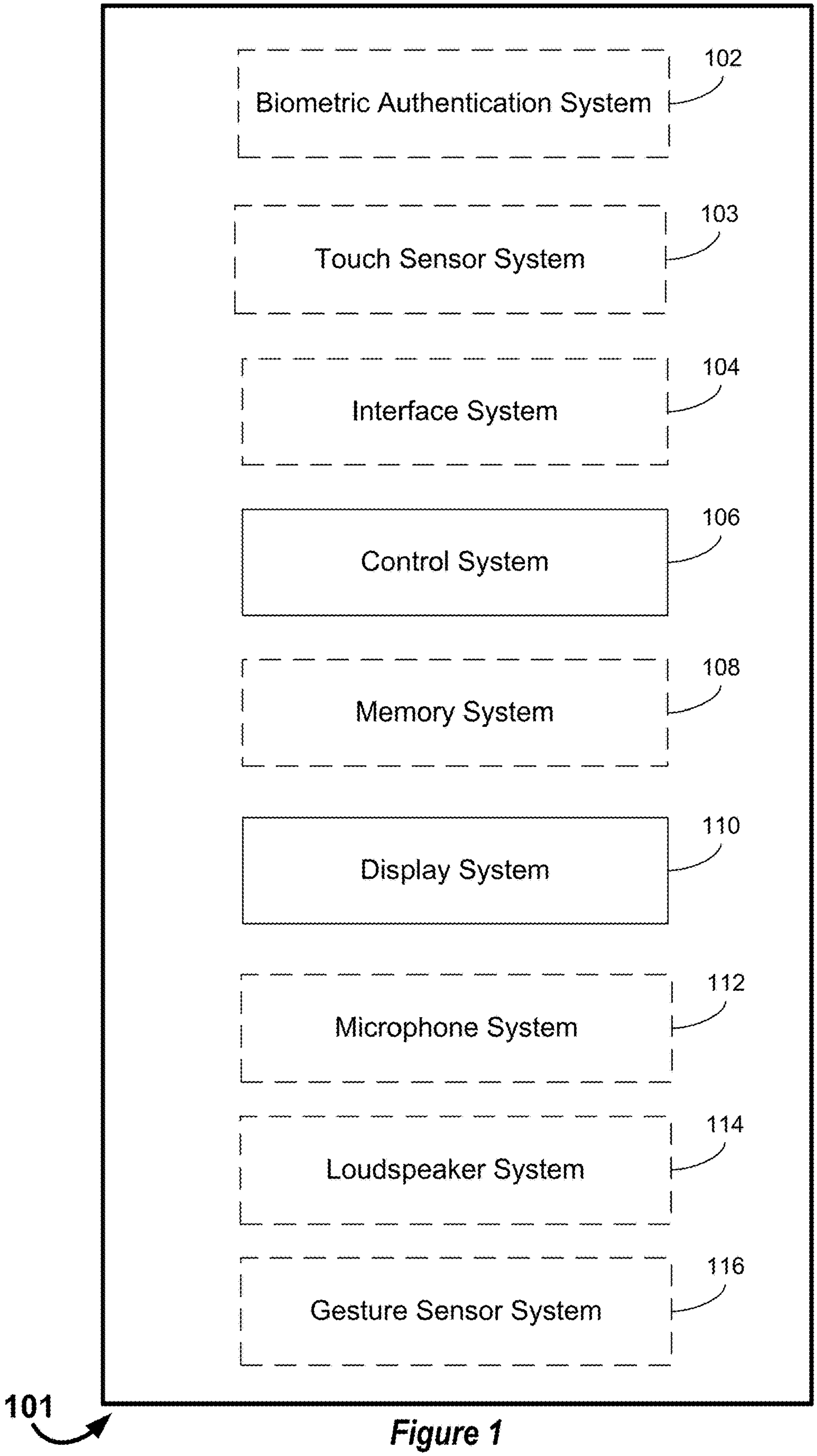
FIG. 1 is a block diagram that illustrates example components of an apparatus.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (such as e-readers), mobile health devices, computer monitors, automobile components, including but not limited to automobile displays (such as odometer and speedometer displays, etc.), cockpit controls or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

When a software application or "app" is open, various virtual buttons may be displayed on a graphical user interface (GUI). Each virtual button may correspond to different software functionality. Some virtual buttons may correspond to important functionality for which access would ideally be restricted. However, once an app is opened, all regions of the app are normally unlocked. This may allow unauthorized or inadvertent triggering of important functionality.

In some devices, an active region of a fingerprint sensor system may extend below a substantial portion of a mobile device's display area. In this context, the "active region" refers to an area of the fingerprint sensor system from which fingerprint image data may be obtained. For example, the active region of a mobile device's fingerprint sensor system may extend below a quarter of the mobile device's display area, half of the mobile device's display area, etc. As used herein, a "fingerprint sensor area" refers to at least a portion of the active region of a fingerprint sensor system.

Some disclosed methods involve displaying one or more "restricted access virtual buttons" in a secure region. The restricted access virtual buttons may correspond to functionality of a software application for which access is restricted. The secure region may, for example, correspond to a fingerprint sensor area. In some examples, the restricted access virtual buttons may correspond to functionality of a software application for which the access is restricted when the software application has been initialized. Some examples may involve presenting one or more unrestricted access virtual buttons in a non-secure region. The unrestricted access virtual buttons may correspond to functionality of the software application for which access is not restricted. The non-secure region may, for example, correspond to a region outside a fingerprint sensor area. However, some alternative examples may involve presenting one or more unrestricted access virtual buttons in a secure region, such as within a fingerprint sensor area. In some such examples, a fingerprint sensor area may be large enough for both restricted access virtual buttons and unrestricted access virtual buttons to be presented in the fingerprint sensor area. However, in some such examples, functionality corresponding to the restricted access virtual buttons may require completion of an authentication process involving the fingerprint sensor for access, whereas functionality corresponding to the unrestricted access virtual buttons may not require completion of an authentication process for access.

Particular implementations of the subject matter described in this disclosure may be implemented to realize one or more of the following potential advantages. In some examples, access to functionality corresponding to restricted access virtual buttons may be controlled via a biometric authentication process, such as an authentication process that involves a fingerprint sensor. For example, functionality corresponding to a selected restricted access virtual button of the one or more restricted access virtual buttons may be enabled only if the authentication process concludes successfully. Such methods may prevent unauthorized or inadvertent triggering of important functionality, such as starting a car, unlocking a door, starting a camera, accessing parental controls on a virtual remote control, click-signing a document, or authorizing a financial transaction. According to some examples, a secure region may be presented differently from a non-secure region, so that it is clear to a user which virtual buttons are restricted access virtual buttons. For example, a boundary may be displayed between the secure region and the non-secure region. Such examples can provide a higher level of security and may provide peace of mind to a user.

FIG. 1 is a block diagram that illustrates example components of an apparatus. In this example, the apparatus 101 includes a control system 106 and a display system 110. Some implementations may include a biometric authentication system 102, a touch sensor system 103, an interface system 104, a memory system 108, a microphone system 112, a loudspeaker system 114, a gesture sensor system 116, or combinations thereof. Some implementations of the apparatus 101 may include an inertial sensor system. The inertial sensor system may include one or more gyroscopes, one or more accelerometers, or combinations thereof. Some implementations of the apparatus 101 may include a haptic feedback system.

In some examples, the biometric authentication system 102 may include a fingerprint sensor, a voice recognition system, a retinal scanner, a retinal scan recognition system, a face recognition system, a gesture sensor system, or combinations thereof. According to some examples, the biometric authentication system 102 may be, or may include, a ultrasonic fingerprint sensor. Alternatively, or additionally, in some implementations the biometric authentication system 102 may be, or may include, an optical fingerprint sensor.

In some examples, an ultrasonic version of a fingerprint sensor system may include an ultrasonic receiver and a separate ultrasonic transmitter. In some such examples, the ultrasonic transmitter may include an ultrasonic plane-wave generator. However, various examples of ultrasonic fingerprint sensors are disclosed herein, some of which may include a separate ultrasonic transmitter and some of which may not. For example, in some implementations, a fingerprint sensor system may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. The fingerprint sensor system may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

Data received from a fingerprint sensor system of the biometric authentication system 102 may sometimes be referred to herein as "fingerprint sensor data," "fingerprint image data," etc., whether or not the received data corresponds to an actual digit or another object from which the fingerprint sensor system has received data. Such data will generally be received from the fingerprint sensor system in the form of electrical signals. Accordingly, without additional processing such image data would not necessarily be perceivable by a human being as an image. As noted elsewhere herein, the word "finger" as used herein may correspond to any digit, including a thumb. Accordingly, a thumbprint is a type of fingerprint.

The touch sensor system 103 (if present) may be, or may include, a resistive touch sensor system, a surface capacitive touch sensor system, a projected capacitive touch sensor system, a surface acoustic wave touch sensor system, an infrared touch sensor system, or any other suitable type of touch sensor system. In some implementations, the area of the touch sensor system 103 may extend over most or all of a display portion of the display system 110.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 also may include one or more memory devices, such as one or more random access memory (RAM) devices, read-only memory (ROM) devices, etc. In this example, the control system 106 is configured for communication with, and for controlling, the display system 110. In implementations where the apparatus includes a biometric authentication system 102, the control system 106 may be configured for communication with, and for controlling, the biometric authentication system 102. In implementations where the apparatus includes a touch sensor system 103, the control system 106 may be configured for communication with, and for controlling, the touch sensor system 103. In implementations where the apparatus includes a memory system 108 that is separate from the control system 106, the control system 106 also may be configured for communication with the memory system 108. In implementations where the apparatus includes a microphone system 112, the control system 106 may be configured for communication with, and for controlling, the microphone system 112. In implementations where the apparatus includes a loudspeaker system 114, the control system 106 may be configured for communication with, and for controlling, the loudspeaker system 114. According to some examples, the control system 106 may include one or more dedicated components for controlling the biometric authentication system 102, the touch sensor system 103, the memory system 108, the display system 110, the microphone system 112, or the loudspeaker system 114. In some implementations, functionality of the control system 106 may be partitioned between one or more controllers or processors, such as between a dedicated sensor controller and an applications processor of a mobile device.

In some examples, the memory system 108 may include one or more memory devices, such as one or more RAM devices, ROM devices, etc. In some implementations, the memory system 108 may include one or more computer-readable media, storage media or storage media. Computer-readable media include both computer storage media and communication media including any medium that may be enabled to transfer a computer program from one place to another. Storage media may be any available media that may be accessed by a computer. In some examples, the memory system 108 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

Some implementations of the apparatus 101 may include an interface system 104. In some examples, the interface system 104 may include a wireless interface system. In some implementations, the interface system 104 may include a user interface system, one or more network interfaces, one or more interfaces between the control system 106 and the biometric authentication system 102, one or more interfaces between the control system 106 and the touch sensor system 103, one or more interfaces between the control system 106 and the memory system 108, one or more interfaces between the control system 106 and the display system 110, one or more interfaces between the control system 106 and the microphone system 112, one or more interfaces between the control system 106 and the loudspeaker system 114, one or more interfaces between the control system 106 and the gesture sensor system 116, one or more interfaces between the control system 106 and one or more external device interfaces (such as ports or applications processors), or combinations thereof.

The interface system 104 may be configured to provide communication (which may include wired or wireless communication, electrical communication, radio communication, etc.) between components of the apparatus 101. In some such examples, the interface system 104 may be configured to provide communication between the control system 106 and the biometric authentication system 102. According to some examples, the interface system 104 may couple at least a portion of the control system 106 to the biometric authentication system 102 and the interface system 104 may couple at least a portion of the control system 106 to the touch sensor system 103, such as via electrically conducting material (for example, via conductive metal wires or traces). According to some examples, the interface system 104 may be configured to provide communication between the apparatus 101 and one or more other devices. In some examples, the interface system 104 may be configured to provide communication between the apparatus 101 and a human being. In some such examples, the interface system 104 may include one or more user interfaces. In some examples, the user interface(s) may be provided via the touch sensor system 103, the display system 110, the microphone system 112, the gesture sensor system 116, a haptic feedback system, or combinations thereof. Accordingly, while the interface system 104, the touch sensor system 103, the display system 110, the microphone system 112 and the gesture sensor system 116 are shown as separate elements in FIG. 1, in some implementations the interface system 104 may include one or more of these elements, other elements (such as a haptic feedback system) or combinations thereof. The interface system 104 may, in some examples, include one or more network interfaces or one or more external device interfaces (such as one or more universal serial bus (USB) interfaces or a serial peripheral interface (SPI)).

In this example, the apparatus 101 includes a display system 110 having one or more displays. In some examples, the display system 110 may be, or may include, a light-emitting diode (LED) display, such as an organic light-emitting diode (OLED) display. In some such examples, the display system 110 may include layers, which may be referred to collectively as a "display stack."

In some implementations, the apparatus 101 may include a microphone system 112. The microphone system 112 may include one or more microphones.

According to some implementations, the apparatus 101 may include a loudspeaker system 114. The loudspeaker system 114 may include one or more loudspeakers.

In some implementations, the apparatus 101 may include a gesture sensor system 116. The gesture sensor system 116 may be, or may include, an ultrasonic gesture sensor system, an optical gesture sensor system or any other suitable type of gesture sensor system. In some examples, the control system may be configured to perform an authentication process that is based, at least in part, on gesture sensor signals from the gesture sensor system 116. For example, the control system may be configured to perform an authentication process that is based on matching a shape, pattern, etc., corresponding to gesture sensor signals received from the gesture sensor system 116 with a shape, pattern, etc., that was previously received, e.g., during an enrollment process. Accordingly, although shown as separate blocks in FIG. 1, the gesture sensor system 116 may, in some implementations, function as part of the biometric authentication system 102.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or other head-mounted device, or a patch. In some implementations, the control system 106 may reside in more than one device. For example, a portion of the control system 106 may reside in a wearable device and another portion of the control system 106 may reside in another device, such as a mobile device (for example, a smartphone). In other examples, a portion of the control system 106 may reside in a local device (such as a mobile device) and another portion of the control system 106 may reside in a remote device, such as a server. The interface system 104 also may, in some such examples, reside in more than one device.

Figure 2:
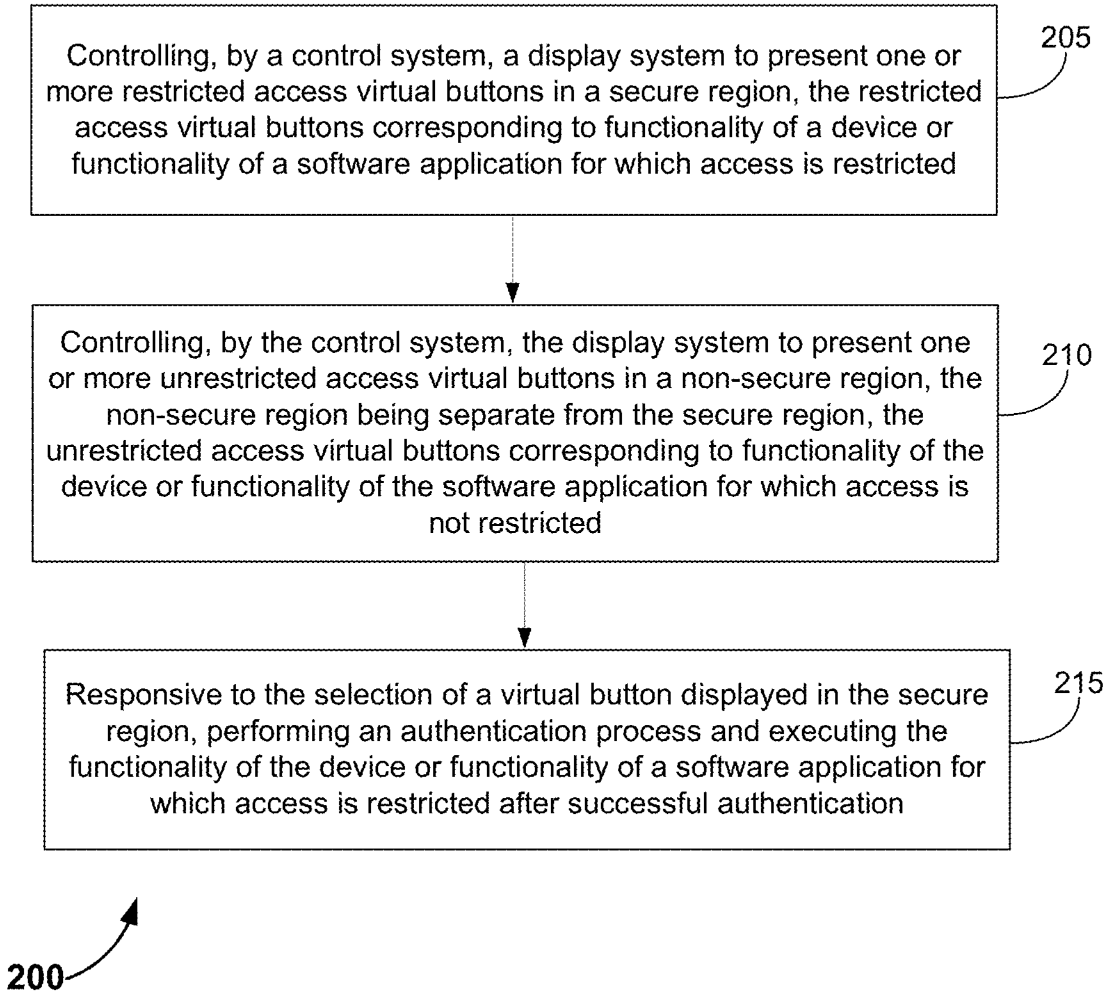
FIG. 2 is a flow diagram that presents examples of operations according to some disclosed methods.

FIG. 2 is a flow diagram that presents examples of operations according to some disclosed methods. The blocks of FIG. 2 may be performed by an apparatus that includes a display and a control system. The blocks of FIG. 2 may, for example, be performed by the apparatus 101 of FIG. 1 or by a similar apparatus. For example, in some implementations the control system 106 of FIG. 1 may be configured to perform, at least in part, the operations that are described herein with reference to FIG. 2. In some examples, the apparatus may be a mobile device, such as a cellular telephone. However, in other examples, the apparatus may be another type of device, such as a tablet, a laptop, an automobile or component thereof, a wearable device, etc. As with other methods disclosed herein, the methods outlined in FIG. 2 may include more or fewer blocks than indicated. Moreover, the blocks of methods disclosed herein are not necessarily performed in the order indicated. In some implementations, one or more blocks may be performed concurrently.

In this example, block 205 involves controlling, by a control system, a display system to present one or more restricted access virtual buttons in a secure region. In this example, the restricted access virtual buttons correspond to functionality of a device or functionality of a software application for which access is restricted. According to some examples, the restricted access virtual buttons may correspond to functionality of the software application for which access is restricted when the software application has been initialized. In other examples, the restricted access virtual buttons may correspond to functionality of the device that is not directly associated with a particular software application, such as functionality of the device that is related to operating system functionality. According to some examples, the restricted access virtual buttons correspond to functionality of a device or functionality of a software application for which access is restricted when the device is in a secure state, such as a "locked" state or a "sleep mode" state (also referred to herein as a "sleep condition"). In some examples, access to functionality corresponding to the restricted access virtual buttons may be controlled via a biometric authentication process. In some such examples, the secure region corresponds to a fingerprint sensor area. Accordingly, in some such examples block 205 may involve controlling a display system to present one or more restricted access virtual buttons in the fingerprint sensor area.

According to this example, block 210 involves controlling, by the control system, the display system to present one or more unrestricted access virtual buttons in a non-secure region. In this example, the non-secure region is separate from the secure region. Accordingly, in this example, the control system is configured to control the display system to display the non-secure region separately from the secure region. In some such examples, block 210 may involve controlling the display system to display the non-secure region separately from the secure region, but to display the non-secure region on the same display on which the secure region is displayed. In some alternative examples, block 210 may involve controlling the display system to display the non-secure region on a first display of the display system and to display the non-secure region on a second display of the display system. In this example, the unrestricted access virtual buttons corresponding to functionality of the device or functionality of the software application for which access is not restricted. In some examples, block 210 may involve controlling a display system to present one or more unrestricted access virtual buttons outside of a fingerprint sensor area.

In this example, block 215 involves performing an authentication process responsive to the selection of a virtual button displayed in the secure region. In some examples, the authentication process may be performed by the control system. In some examples, block 215 may involve initiating, by the control system and responsive to receiving an indication of a touch in a restricted access virtual button area, the authentication process. The indication of the touch may, for example, correspond to signals received by the control system from a touch sensor system, such as the optional touch sensor system 103 that is described above with reference to FIG. 1. According to some examples, the restricted access virtual button area may correspond to a selected restricted access virtual button of the one or more restricted access virtual buttons.

According to some examples, the secure region may correspond to a fingerprint sensor area. In some such examples, the authentication process may be, or may include, a fingerprint authentication process. However, in other implementations the authentication process may be, or may include, a different type of process, such as a retinal scan or a gesture detection process. In some implementations wherein the authentication process is, or includes, a retinal scan, the control system may be configured to determine, for example according to image data from a camera system, that a user is viewing the secure region. However, it is not essential that the control system be configured to determine whether the user is viewing the secure region in the context of (for example, prior to performing) a retinal scan. The retinal scan may, for example, be initiated responsive to detection of a touch in the secure region. The authentication process may involve prompting the user to position an eye in a location and orientation that is suitable for a retinal scan, for example by prompting the user to look at a target displayed on a display. The target may, for example, be located near a camera or other sensor that is configured for performing the retinal scan.

According to this example, block 215 involves executing the functionality of the device or functionality of a software application for which access is restricted after successful authentication. In some examples, the control system may execute the functionality of the device or the functionality of the software application for which access is restricted after successful authentication. According to some such examples, functionality corresponding to a selected restricted access virtual button may be enabled only if the authentication process concludes successfully. According to some such examples, the control system may be configured to prevent access to functionality corresponding to the restricted access virtual buttons if the authentication process is not successful.

In some instances, a user may select a virtual button displayed in the non-secure region. The virtual button displayed in the non-secure region may correspond to functionality for which access is not restricted. In some implementations, in response to the selection of a virtual button displayed in the non-secure region, the control system may be configured to execute (or cause to be executed) the functionality of the device or the functionality of a software application for which access is not restricted without requiring that an authentication process be successfully completed.

In some implementations, method 200 may involve controlling, by the control system, the display system to present the secure region differently from the non-secure region. Some such examples may involve controlling the display system to present a boundary between the secure region and the non-secure region. Alternatively, or additionally, some examples may involve controlling the display system to present the secure region in one color and the non-secure region in another color, to present the secure region with one background pattern and the non-secure region with another background pattern, to present the secure region with one level of pixel brightness and the non-secure region with another level of pixel brightness, or combinations thereof.

Figures 3A, 3B, 3C:
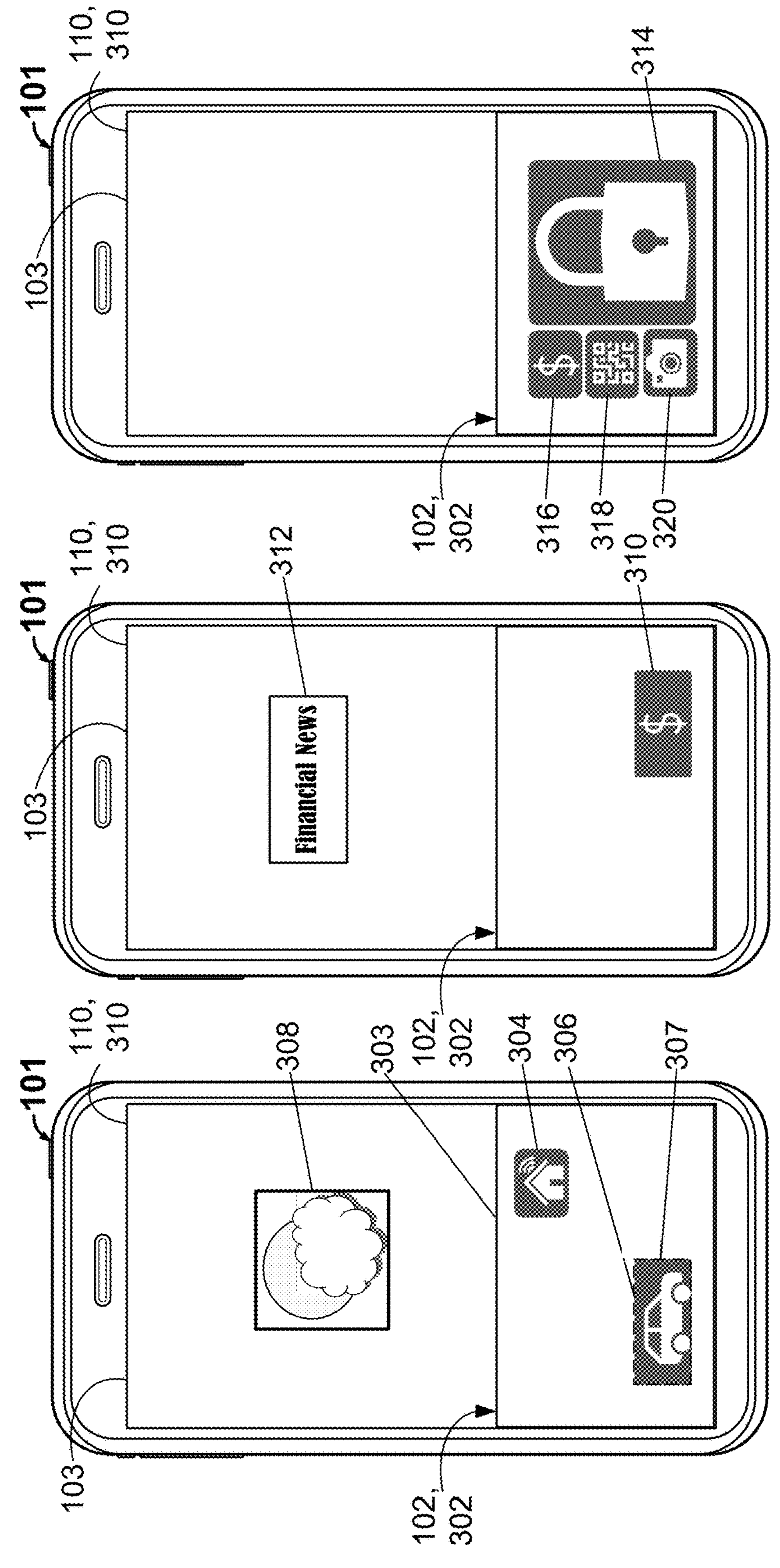
FIGS. 3A, 3B and 3C show examples of devices configured to perform at least some disclosed methods.

FIGS. 3A, 3B and 3C show examples of devices configured to perform at least some disclosed methods. As with other disclosed examples, the types, numbers and arrangements of elements that are shown in FIGS. 3A, 3B and 3C are merely presented by way of example. Other examples may include different types of elements, numbers of elements, arrangements of elements, or combinations thereof.

In these examples, the apparatus 101 is an instance of the apparatus 101 of FIG. 1. In these implementations, the apparatus 101 is a mobile device that includes a biometric authentication system 102, a control system 106 (not shown in FIG. 2) and a display system 110. In these examples, biometric authentication system 102 includes a fingerprint sensor system. The fingerprint sensor system may be, or may include, an ultrasonic fingerprint sensor, an optical fingerprint sensor, or another type of fingerprint sensor.

According to these examples, an active area 302 of the fingerprint sensor system is outlined in a solid line. The active area 302 may, for example, be an area that includes an array of fingerprint sensor pixels. According to this example, the active area 302 corresponds with slightly more than ⅓ of the display area 310 of the display system 110. In alternative implementations, the active area 302 may correspond a larger portion or a smaller portion of the display area 310.

The active area 302 of the fingerprint sensor system is one example of a "secure region" as disclosed herein. FIGS. 3A, 3B and 3C show examples of devices presenting graphical user interfaces (GUIs) having restricted access virtual buttons and unrestricted access virtual buttons. According to these examples, the restricted access virtual buttons are presented within a secure region corresponding to the active area 302 and the unrestricted access virtual buttons are presented outside the secure region. In these examples, the control system is controlling the display system to present the secure region differently from the non-secure region: according to these examples, the control system is controlling the display system to present a boundary line 303, corresponding to the outline of the active area 302, between the secure region and the non-secure region. In some alternative examples, the secure region may be indicated as such, for example by displayed text such as "Secure Region."

In the example shown in FIG. 3A, restricted access virtual buttons 304 and 306 are being displayed in the secure region. In this example, restricted access virtual buttons 304 and 306 correspond to functionality for which access is restricted: here, access to functionality corresponding to the restricted access virtual buttons is controlled via a biometric authentication process, which in this example is a fingerprint authentication process. In this example, a control system 106 (not shown) of the apparatus 101 is configured to initiate, responsive to receiving an indication of a touch in a restricted access virtual button area, an authentication process involving a fingerprint sensor of the biometric authentication system 102. A "restricted access virtual button area" corresponds to some or all of the area occupied by a restricted access virtual button. For example, the area inside the dashed line 307 is one example of a restricted access virtual button area. According to this example, the touch indication may be provided by the touch sensor system 103 to the control system 106.

In some instances, the control system 106 may be configured to determine fingerprint features, such as fingerprint minutiae, based on fingerprint image data received from the fingerprint sensor in a restricted access virtual button area. According to some examples, an authentication process performed by the control system 106 may involve determining whether a currently-obtained set of fingerprint minutiae matches a previously-obtained set of fingerprint minutiae, the latter of which may have been obtained during an enrollment process.

According to this example, a user may access house-related software functionality by interacting with restricted access virtual button 304 and one or more GUIs that may subsequently be presented. In this example, a user may access automobile-related functionality by interacting with restricted access virtual button 306 and one or more GUIs that may subsequently be presented. According to this example, a user may access weather-related software functionality by interacting with unrestricted access virtual button 308 and one or more GUIs that may subsequently be presented.

In some examples, restricted access virtual buttons 304 and 306 (and, in some instances, unrestricted access virtual button 308) may correspond to functionality that is provided by a single software application. In some such examples, restricted access virtual buttons 304 and 306 (and, in some instances, unrestricted access virtual button 308) may correspond to functionality that is provided by the single software application after the software application has been initialized or "opened." However, in other examples, restricted access virtual buttons 304 and 306 (and, in some instances, unrestricted access virtual button 308) may correspond to functionality that is provided by more than one software application.

In some examples, a user may access functionality of a house alarm system via restricted access virtual button 304, or via a similar virtual button. In some such examples, a user may access functionality relating to one or more home security cameras, one or more remotely-operable doors, one or more smart doorbell systems (such as smart doorbell systems that allow a user to view and/or communicate with a person standing near a door), etc., via restricted access virtual button 304. According to some examples, a user may access functionality of a "smart home" system via restricted access virtual button 304, or via a similar virtual button. In some such examples, a user may access functionality relating to heating and/or cooling a home, functionality relating to controlling one or more home appliances, etc., via restricted access virtual button 304. In some examples, a user may access functionality of a solar energy system via restricted access virtual button 304, or via a similar virtual button. In some such examples, a user may access information via restricted access virtual button 304 relating to the power currently being generated by the solar energy system, power currently being used by the home and/or power currently being provided by, or provided to, a battery system. According to some such examples, a user may access functionality relating to the current configuration of the solar energy system, such as the minimum amount of energy that will be retained in the battery system unless there is a power outage, via restricted access virtual button 304.

In some examples, the automobile-related functionality that a user may access by interacting with restricted access virtual button 306, or via a similar virtual button, may include automobile heating or cooling functionality, automobile locking or unlocking functionality, etc. In some examples, the automobile-related functionality may involve automobile movement, such as parking functionality or summoning functionality. In some examples, the automobile-related functionality may include electric vehicle functionality, such as initiating a battery charging session, selecting a battery charging limit, selecting one or more future battery charging times, etc.

In the example shown in FIG. 3B, restricted access virtual button 310 is being displayed in the secure region. In this example, as in the example of FIG. 3A, restricted access virtual button 310 corresponds to functionality for which access is restricted: here, access to functionality corresponding to restricted access virtual button 310 is controlled via a biometric authentication process, which in this example is a fingerprint authentication process. According to this example, a user may access finance-related software functionality by interacting with restricted access virtual button 310. In some such examples, a user may make a payment, review one or more financial account balances, cause money to be transferred into or out of a financial account, etc., by interacting with restricted access virtual button 310 and one or more GUIs that may subsequently be presented. In this example, a user may access a financial news software application by interacting with unrestricted access virtual button 308.

In some examples, restricted access virtual button 310 and unrestricted access virtual button 312 may correspond to functionality that is provided by a single software application. In some such examples, —restricted access virtual button 310 and unrestricted access virtual button 312 may correspond to functionality that is provided by the single software application after the software application has been initialized or "opened." However, in other examples, restricted access virtual button 310 and unrestricted access virtual button 312 may correspond to functionality that is provided by more than one software application.

FIG. 3C shows an example of images that may be presented when the apparatus 101 is locked. In the example shown in FIG. 3C, restricted access virtual buttons 314, 316, 318 and 320 are being displayed in the secure region. In this example, restricted access virtual buttons 314, 316, 318 and 320 correspond to functionality for which access is restricted: here, access to functionality corresponding to restricted access virtual buttons 314, 316, 318 and 320 is controlled via a biometric authentication process, which in this example is a fingerprint authentication process.

In this example, a user may unlock the apparatus 101 by touching the virtual button 314, if a subsequent fingerprint authentication process concludes successfully. In some implementations, a user may access functionality corresponding to restricted access virtual button 316, 318 or 320 without the need for unlocking the apparatus 101 via the virtual button 314. According to this example, a user may access finance-related software functionality by interacting with restricted access virtual button 316 and one or more GUIs that may subsequently be presented. In some such examples, a user may make a payment, review one or more financial account balances, cause money to be transferred into or out of a financial account, etc., by interacting with restricted access virtual button 316 and one or more GUIs that may subsequently be presented. In this example, a user may access scanner-related software functionality, such as functionality relating to barcode scanning, by interacting with restricted access virtual button 318 and one or more GUIs that may subsequently be presented. According to this example, a user may access camera-related software functionality by interacting with restricted access virtual button 320 and one or more GUIs that may subsequently be presented.

Figure 4:
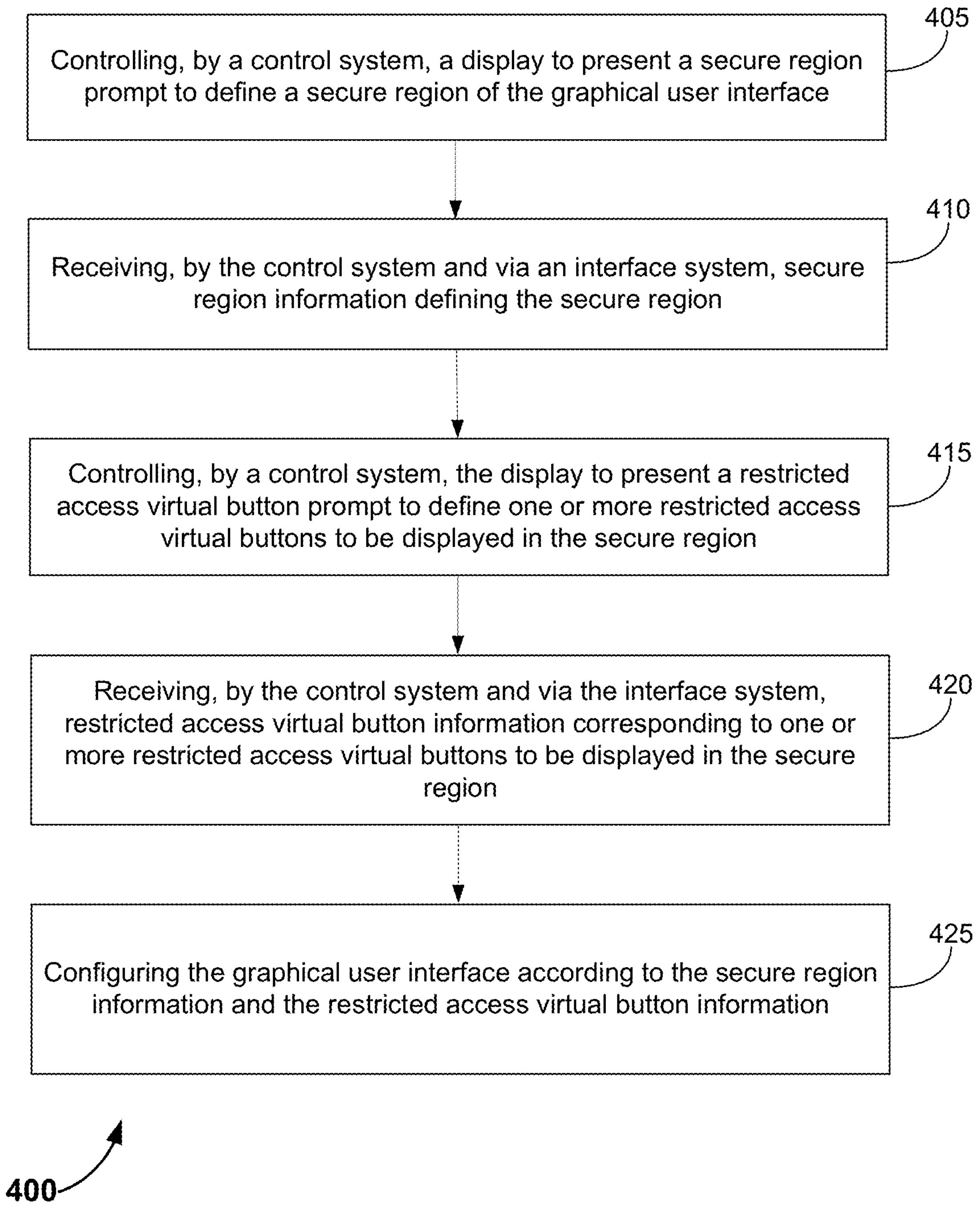
FIG. 4 is a flow diagram that presents examples of operations according to some alternative methods.

FIG. 4 is a flow diagram that presents examples of operations according to some alternative methods. The blocks of FIG. 4 may be performed by an apparatus that includes a display system and a control system. The blocks of FIG. 4 may, for example, be performed by the apparatus 101 of FIG. 1 or by a similar apparatus. For example, in some implementations the control system 106 of FIG. 1 may be configured to perform, at least in part, the operations that are described herein with reference to FIG. 4. In some examples, the apparatus may be a mobile device, such as a cellular telephone. However, in other examples, the apparatus may be another type of device, such as a tablet, a laptop, etc.

In some examples, method 400 may be performed, at least in part, by a server. According to some such examples, in blocks 405 and 415 a server may cause the display system of another device (such as an end user device or EUD) to present the displays noted in blocks 405 and 415, for example according to instructions sent by the server to the EUD. As with other methods disclosed herein, the methods outlined in FIG. 4 may include more or fewer blocks than indicated. Moreover, the blocks of methods disclosed herein are not necessarily performed in the order indicated. In some implementations, one or more blocks may be performed concurrently.

In this example, block 405 involves controlling, by a control system, a display system to present a secure region prompt to define a secure region of the graphical user interface. As noted above, in some alternative examples block 405 may involve a control system of one device, such as a server, causing a display of another device, such as an EUD display, to present a secure region prompt to define a secure region of the graphical user interface. In this example, block 410 involves receiving, by the control system and via an interface system, secure region information defining the secure region.

Figure 5A:
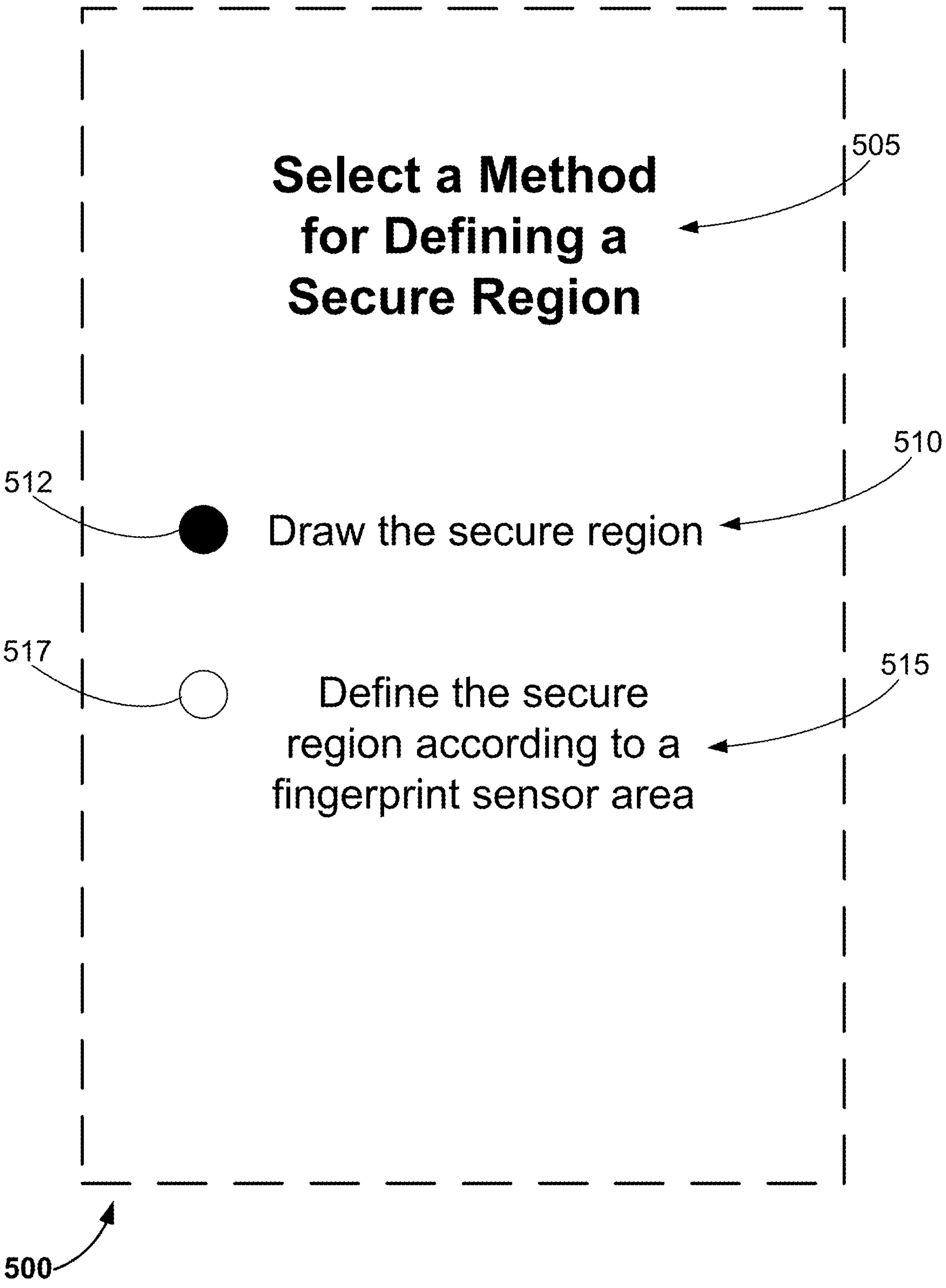
FIGS. 5A, 5B and 5C show examples of graphical user interfaces (GUIs) that may be used to implement some aspects of the present disclosure.
Figure 5B:
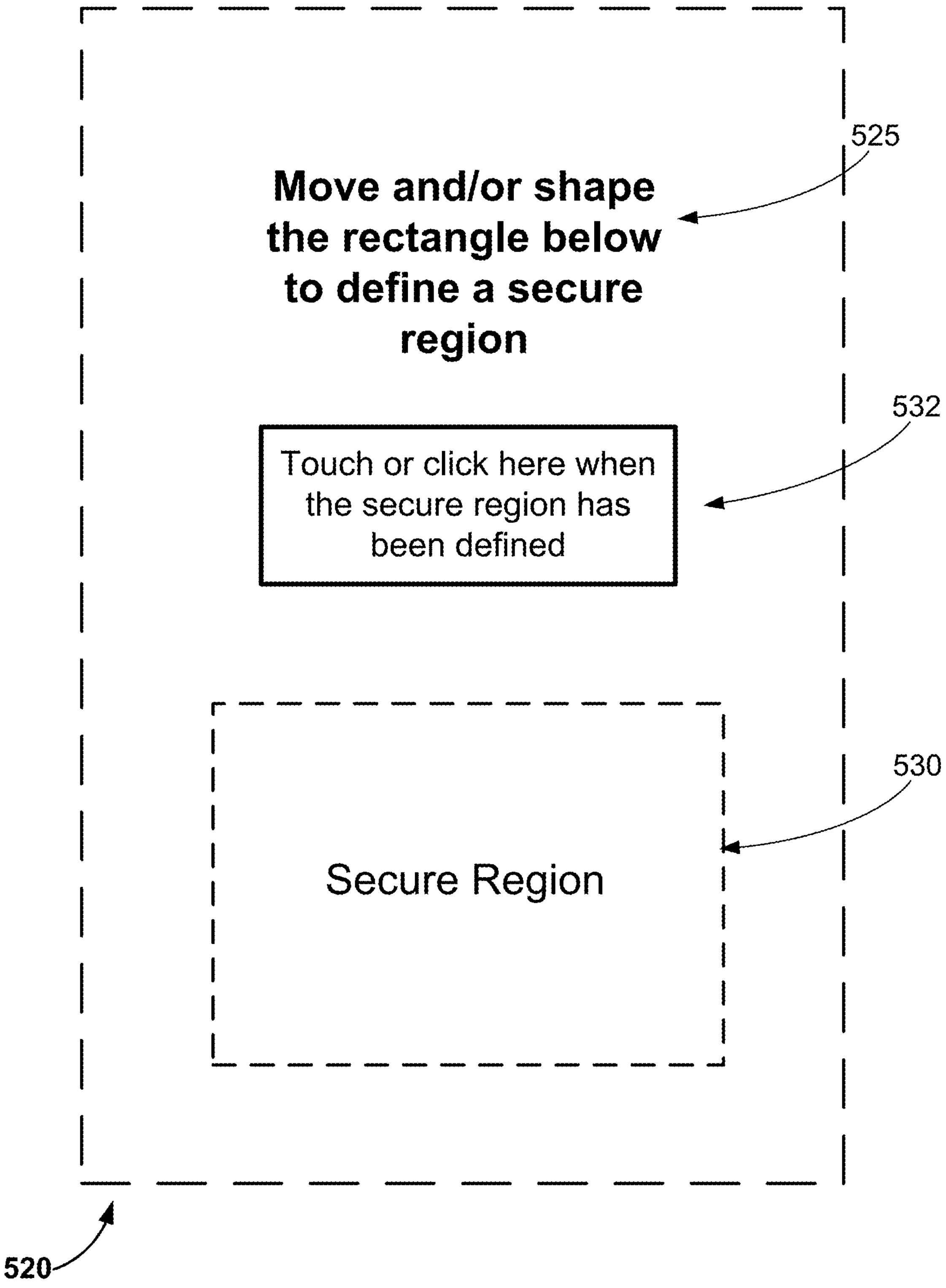
Figure 5C:
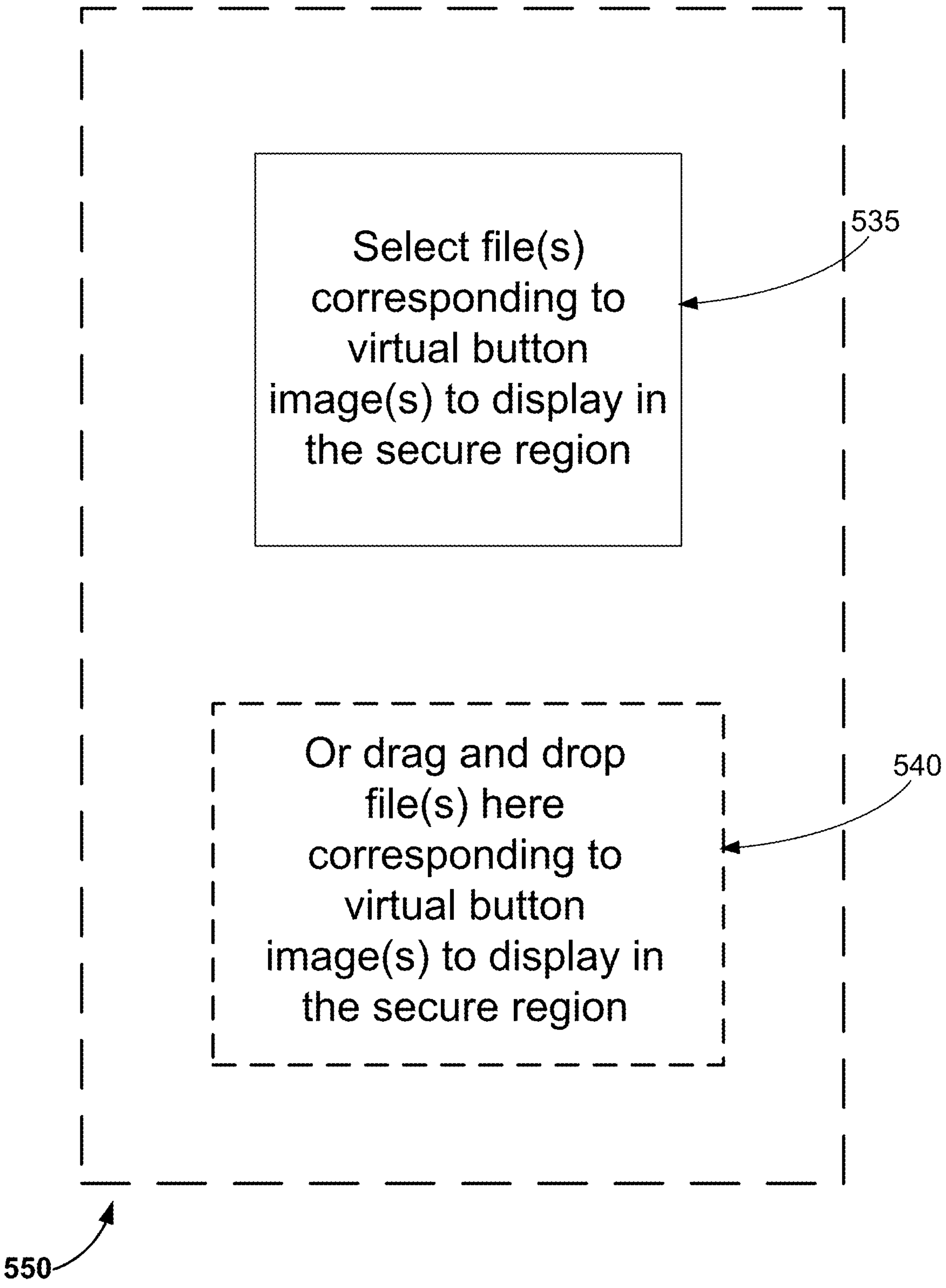

FIGS. 5A, 5B and 5C show examples of graphical user interfaces (GUIs) that may be used to implement some aspects of the present disclosure. FIG. 5A shows an example of a prompt that may be presented according to block 405 of FIG. 4. In this example, an apparatus (which may be an instance of the apparatus 101 disclosed herein) is presenting a GUI 500. According to this example, the textual prompt 500 prompts a user to select a method for defining a secure region. A user may select an option of drawing the secure region, as indicated by textual prompt 510, by interacting with area 512: for example, the user may touch the area 512, click on the area 512, etc. Alternatively, in this example, a user may select an option of defining the secure region according to a fingerprint sensor area, as indicated by textual prompt 515, by interacting with area 517.

In this example, if a user interacts with the area 512 or the area 517, one or more additional GUIs will be presented that allow a user to provide the secure region information of block 410 of FIG. 4. For example, if a user selects the area 512, one or more additional GUIs will be presented that allow a user to draw the secure region.

FIG. 5B shows an example of a GUI that may be presented responsive to an indication that a user has selected the area 512 of FIG. 5A. In this example, the GUI 520 includes a textual prompt 525 to define a secure region by moving and/or shaping the secure region rectangle 530. For example, a user may shape the secure region rectangle 530 via a multi-finger touch, such as by pinching the secure region rectangle 530 to cause it to be displayed as a smaller shape, by expanding the secure region rectangle 530 to cause it to be displayed as a larger shape, etc. Alternatively, or additionally, in some examples a user may move the secure region rectangle 530 via a single-finger touch. According to this example, a user may indicate that the secure region has been defined by touching or clicking the text box 532. In some examples, responsive to detecting an interaction with the text box 532, a control system may receive, via an interface system, secure region information defining the secure region. This is one example of block 410 of FIG. 4. In other examples, the secure region may be a shape other than a rectangular shape.

In some examples, if a user selects the area 517 of FIG. 5A, one or more additional GUIs will be presented that allow a user to define the secure region according to a fingerprint sensor area. In some such examples, one or more additional GUIs will be presented that allow a user to specify a product (such as a particular type of mobile device, e.g., a type of cellular telephone) that includes a fingerprint sensor. A control system may be configured to access a data structure than includes products and corresponding fingerprint sensor areas. In some such implementations, the control system may be configured to present (or cause to be presented) an image of the product or a portion thereof, indicating a secure region corresponding to the fingerprint sensor area.

Returning to FIG. 4, in this example block 415 involves controlling, by a control system, the display system to present a restricted access virtual button prompt to define one or more restricted access virtual buttons to be displayed in the secure region. As noted above, in some alternative examples block 415 may involve a control system of one device, such as a server, causing a display of another device, such as an EUD display, to present a restricted access virtual button prompt to define one or more restricted access virtual buttons to be displayed in the secure region. In this example, block 420 involves receiving, by the control system and via an interface system, restricted access virtual button information corresponding to one or more restricted access virtual buttons to be displayed in the secure region.

FIG. 5C shows an example of a GUI that may be presented in accordance with block 415 of FIG. 4. In this example, a user may interact with the text box 535 of the GUI 550 (for example, by touching the text box 535 or clicking on the text box 535) in order to select one or more files corresponding to virtual button images to display in the secure region. Responsive to receiving user input via the text box 535, in some examples a control system may launch a browser application that allows the user to select one or more files corresponding to virtual button images.

In this example, the GUI 550 also includes a "drag and drop" area 540. Instead of (or in addition to) selecting one or more files corresponding to virtual button images via the text box 535, in this example a user may select one or more such files (for example, after opening another window that provides access to one or more files corresponding to virtual button images) and drag them to the "drag and drop" area 540. Accordingly, in this example the control system may receive restricted access virtual button information corresponding to one or more restricted access virtual buttons to be displayed in the secure region, according to block 420 of FIG. 4, either via the text box 535 or via the "drag and drop" area 540 of FIG. 5C.

According to some examples, method 400 of FIG. 4 may involve receiving functionality information corresponding to each restricted access virtual button information, additional GUI information regarding one or more GUIs to be presented responsive to interactions with each restricted access virtual button information, etc.

In some examples, method 400 may involve controlling, by a control system, the display system to present an unrestricted access virtual button prompt to define one or more unrestricted access virtual buttons to be displayed outside of the secure region. In some alternative examples method 400 may involve a control system of one device, such as a server, causing a display of another device, such as an EUD display, to present an unrestricted access virtual button prompt to define one or more unrestricted access virtual buttons to be displayed outside of the secure region. Method 400 also may involve receiving, by the control system and via an interface system, unrestricted access virtual button information corresponding to one or more unrestricted access virtual buttons to be displayed outside the secure region.

In this example, block 425 involves configuring the graphical user interface according to the secure region information and the restricted access virtual button information. In some examples, method 400 may involve configuring the graphical user interface according to unrestricted access virtual button information. In some such examples, method 400 may involve displaying a graphical user interface that includes restricted access virtual buttons displayed in the secure region and unrestricted access virtual buttons displayed outside of the secure region. In some such examples, method 400 may involve saving one or more files corresponding to the graphical user interface.

Implementation examples are described in the following numbered clauses:

1. A method of controlling a device, the method involving: controlling, by a control system, a display system to present one or more restricted access virtual buttons in a secure region, the restricted access virtual buttons corresponding to functionality of the device or functionality of a software application for which access is restricted; controlling, by the control system, the display system to present one or more unrestricted access virtual buttons in a non-secure region, the non-secure region being separate from the secure region, the unrestricted access virtual buttons corresponding to functionality of the device or functionality of the software application for which access is not restricted; and responsive to the selection of a virtual button displayed in the secure region, performing an authentication process and executing the functionality of the device or functionality of a software application for which access is restricted after successful authentication.
2. The method of clause 1, where the restricted access virtual buttons correspond to functionality of the device or functionality of the software application for which access is restricted when the device is in a secure state, the secure state corresponding to a locked or sleep condition, or when the software application has been initialized.
3. The method of clause 1 or clause 2, where the access to functionality corresponding to the restricted access virtual buttons is prevented if the authentication process is not successful.
4. The method of any one of clauses 1-3, where the secure region corresponds to a fingerprint sensor area and where the authentication process is a fingerprint authentication process.
5. The method of any one of clauses 1-4, further involving, in response to the selection of a virtual button displayed in the non-secure region, executing the functionality of the device or functionality of a software application for which access is not restricted without authentication.
6. The method of any one of clauses 1-5, where the secure region is presented on a first display of the display system and where the non-secure region is presented on a second display of the display system.
7. The method of any one of clauses 1-6, further involving controlling, by the control system, the display system to present the secure region differently from the non-secure region.
8. The method of any one of clauses 1-7, where the authentication process comprises a retinal scan or a gesture detection process.
9. An apparatus, including: a display system including one or more displays; a biometric authentication system; and a control system configured for communication with the display system, the control system configured to: control the display system to present one or more restricted access virtual buttons in a secure region, the restricted access virtual buttons corresponding to functionality of the apparatus or functionality of a software application for which access is restricted; control the display system to present one or more unrestricted access virtual buttons in a non-secure region, the non-secure region being separate from the secure region, the unrestricted access virtual buttons corresponding to functionality of the apparatus or functionality of the software application for which access is not restricted; and, responsive to the selection of a virtual button displayed in the secure region, control the biometric authentication system to perform an authentication process; execute the functionality of the device or functionality of a software application for which access is restricted after successful authentication; and prevent executing the functionality of the device or functionality of a software application for which access is restricted if the authentication process is not successful.

10. The apparatus of clause 9, where the restricted access virtual buttons correspond to functionality of the apparatus or functionality of the software application for which the access is restricted when the apparatus is in a secure state, the secure state corresponding to a locked or sleep condition.

11. The apparatus of clause 9 or clause 10, where the restricted access virtual buttons correspond to functionality of the apparatus or functionality of the software application for which the access is restricted when the software application has been initialized.

12. The apparatus of any one of clauses 9-11, where the secure region corresponds to a biometric authentication system area of the biometric authentication system.

13. The apparatus of any one of clauses 9-12, where the biometric authentication system includes a fingerprint sensor system and where the secure region corresponds to a fingerprint sensor area of the fingerprint sensor system.

14. The apparatus of any one of clauses 9-13, where, responsive to the selection of a virtual button displayed in the non-secure region, the control system is further configured to execute the functionality of the device or functionality of a software application for which access is not restricted without authentication.

15. The apparatus of any one of clauses 9-14, where the control system is configured to present the secure region on a first display of the display system and to present the non-secure region on a second display of the display system.

16. The apparatus of any one of clauses 9-15, where the control system is further configured to control the display system to present the secure region differently from the non-secure region.

17. The apparatus of any one of clauses 9-16, where the authentication process comprises a retinal scan or a gesture detection process.

18. An apparatus, including: a display system including one or more displays; a biometric authentication system; and control means for: controlling the display system to present one or more restricted access virtual buttons in a secure region, the restricted access virtual buttons corresponding to functionality of the apparatus or functionality of a software application for which access is restricted; controlling the display system to present one or more unrestricted access virtual buttons in a non-secure region, the non-secure region being separate from the secure region, the unrestricted access virtual buttons corresponding to functionality of the apparatus or functionality of the software application for which access is not restricted; and, responsive to the selection of a virtual button displayed in the secure region, control the biometric authentication system to perform an authentication process; execute the functionality of the device or functionality of a software application for which access is restricted after successful authentication; and prevent executing the functionality of the device or functionality of a software application for which access is restricted if the authentication process is not successful.

19. The apparatus of clause 18, where the restricted access virtual buttons correspond to functionality of the apparatus or functionality of the software application for which the access is restricted when the apparatus is in a secure state or when the software application has been initialized.

20. The apparatus of clause 18 or clause 19, where, responsive to the selection of a virtual button displayed in the non-secure region, the control means includes means for executing the functionality of the device or functionality of a software application for which access is not restricted without authentication.

21. One or more non-transitory media having instructions stored thereon for controlling an apparatus to perform a method, the method involving: controlling, by a control system of the apparatus, a display system of the apparatus to present one or more restricted access virtual buttons in a secure region, the restricted access virtual buttons corresponding to functionality of the apparatus or functionality of a software application for which access is restricted; and controlling, by the control system, the display system to present one or more unrestricted access virtual buttons in a non-secure region, the non-secure region being separate from the secure region, the unrestricted access virtual buttons corresponding to functionality of the apparatus or functionality of the software application for which access is not restricted; and in response to the selection of a virtual button displayed in the secure region, performing an authentication process and executing the functionality of the device or functionality of a software application for which access is restricted after successful authentication.

22. The one or more non-transitory media of clause 21, where the access to functionality corresponding to the restricted access virtual buttons is prevented if the authentication process is not successful.

23. The one or more non-transitory media of clause 21 or clause 22, where the method further comprises, in response to the selection of a virtual button displayed in the non-secure region, executing the functionality of the device or functionality of a software application for which access is not restricted without authentication.

24. The one or more non-transitory media of any one of clauses 21-23, where the secure region corresponds to a fingerprint sensor area.

25. A method of developing a graphical user interface for a software application, the method involving: controlling, by a control system, a display system to present a secure region prompt to define a secure region of the graphical user interface; receiving, by the control system and via an interface system, secure region information defining the secure region; controlling, by a control system, the display system to present a restricted access virtual button prompt to define one or more restricted access virtual buttons to be displayed in the secure region; receiving, by the control system and via the interface system, restricted access virtual button information corresponding to one or more restricted access virtual buttons to be displayed in the secure region; and configuring the graphical user interface according to the secure region information and the restricted access virtual button information.

26. The method of clause 25, where the graphical user interface is for a software application designed to run on a mobile device.

27. The method of clause 25 or clause 26, where the secure region information corresponds to a fingerprint sensor area.

28. The method of any one of clauses 25-27, further involving: controlling, by a control system, the display system to present an unrestricted access virtual button prompt to define one or more unrestricted access virtual buttons to be displayed outside of the secure region; receiving, by the control system and via the interface system, unrestricted access virtual button information corresponding to one or more unrestricted access virtual buttons to be displayed outside of the secure region; and configuring the graphical user interface according to the unrestricted access virtual button information.

29. One or more non-transitory media having instructions stored thereon for controlling an apparatus to perform a method, the method involving: controlling, by a control system of the apparatus, a display system of the apparatus to present a secure region prompt to define a secure region of the graphical user interface; receiving, by the control system and via an interface system of the apparatus, secure region information defining the secure region; controlling, by a control system, the display system to present a restricted access virtual button prompt to define one or more restricted access virtual buttons to be displayed in the secure region; receiving, by the control system and via the interface system, restricted access virtual button information corresponding to one or more restricted access virtual buttons to be displayed in the secure region; and configuring the graphical user interface according to the secure region information and the restricted access virtual button information.

30. The one or more non-transitory media of clause 29, where the graphical user interface is for a software application designed to run on a mobile device.

31. The one or more non-transitory media of clause 29 or clause 30, where the secure region information corresponds to a fingerprint sensor area.

32. The one or more non-transitory media of any one of clauses 29-31, further comprising: controlling, by a control system, the display system to present an unrestricted access virtual button prompt to define one or more unrestricted access virtual buttons to be displayed outside of the secure region; receiving, by the control system and via the interface system, unrestricted access virtual button information corresponding to one or more unrestricted access virtual buttons to be displayed outside of the secure region; and configuring the graphical user interface according to the unrestricted access virtual button information.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations presented herein, but is to be accorded the widest scope consistent with the claims, the principles and the novel features disclosed herein. The word “exemplary” is used exclusively herein, if at all, to mean “serving as an example, instance, or illustration.” Any implementation described herein as “exemplary” is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order presented or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. A method of controlling a device, the method comprising:

controlling, by a control system, a display system to present one or more restricted access virtual buttons in a secure region, the restricted access virtual buttons corresponding to functionality of the device or functionality of a software application for which access is restricted;

controlling, by the control system, the display system to present one or more unrestricted access virtual buttons in a non-secure region, the non-secure region being displayed differently from the secure region, the unrestricted access virtual buttons corresponding to functionality of the device or functionality of the software application for which access is not restricted;

responsive to the selection of a virtual button displayed in the secure region, controlling a biometric authentication system to perform an authentication process;

executing the functionality of the device or functionality of a software application for which access is restricted after successful authentication; and preventing execution of the functionality of the device or functionality of a software application for which access is restricted if the authentication process is not successful; and responsive to the selection of a virtual button displayed in the non-secure region, executing the functionality of the device or functionality of a software application for which access is not restricted without authentication.

2. The method of claim 1, wherein the restricted access virtual buttons correspond to functionality of the device or functionality of the software application for which access is restricted when the device is in a secure state, the secure state corresponding to a locked or sleep condition, or when the software application has been initialized.

3. The method of claim 1, wherein the access to functionality corresponding to the restricted access virtual buttons is prevented if the authentication process is not successful.

4. The method of claim 1, wherein the secure region corresponds to a fingerprint sensor area and wherein the authentication process is a fingerprint authentication process.

5. The method of claim 1, wherein the secure region is separate from the non-secure region.

6. The method of claim 1, wherein controlling the display system to present the secure region differently from the non-secure region involves controlling the display system to present a boundary between the secure region and the non-secure region, controlling the display system to present the secure region in one color and the non-secure region in another color, controlling the display system to present the secure region with one background pattern and the non-secure region with another background pattern, controlling the display system to present the secure region with one level of pixel brightness and the non-secure region with another level of pixel brightness, or combinations thereof.

7. The method of claim 1, wherein the authentication process comprises a retinal scan or a gesture detection process.

8. An apparatus, comprising:

a display system including one or more displays;

a biometric authentication system; and a control system configured for communication with the display system, the control system configured to:

control the display system to present one or more restricted access virtual buttons in a secure region, the restricted access virtual buttons corresponding to functionality of the apparatus or functionality of a software application for which access is restricted;

control the display system to present one or more unrestricted access virtual buttons in a non-secure region, the non-secure region being displayed differently from the secure region, the unrestricted access virtual buttons corresponding to functionality of the apparatus or functionality of the software application for which access is not restricted;

responsive to the selection of a virtual button displayed in the secure region, control the biometric authentication system to perform an authentication process;

execute the functionality of the apparatus or functionality of a software application for which access is restricted after successful authentication; and prevent executing the functionality of the apparatus or functionality of a software application for which access is restricted if the authentication process is not successful; and, responsive to the selection of a virtual button displayed in the non-secure region, execute the functionality of the device or functionality of a software application for which access is not restricted without authentication.

9. The apparatus of claim 8, wherein the restricted access virtual buttons correspond to functionality of the apparatus or functionality of the software application for which the access is restricted when the apparatus is in a secure state, the secure state corresponding to a locked or sleep condition.

10. The apparatus of claim 8, wherein the restricted access virtual buttons correspond to functionality of the apparatus or functionality of the software application for which the access is restricted when the software application has been initialized.

11. The apparatus of claim 8, wherein the secure region corresponds to a biometric authentication system area of the biometric authentication system.

12. The apparatus of claim 8, wherein the biometric authentication system includes a fingerprint sensor system and wherein the secure region corresponds to a fingerprint sensor area of the fingerprint sensor system.

13. The apparatus of claim 8, wherein the control system is configured to present the secure region separate from the non-secure region.

14. The apparatus of claim 8, wherein controlling the display system to present the secure region differently from the non-secure region involves controlling the display system to present a boundary between the secure region and the non-secure region, controlling the display system to present the secure region in one color and the non-secure region in another color, controlling the display system to present the secure region with one background pattern and the non-secure region with another background pattern, controlling the display system to present the secure region with one level of pixel brightness and the non-secure region with another level of pixel brightness, or combinations thereof.

15. The apparatus of claim 8, wherein the authentication process comprises a retinal scan or a gesture detection process.

16. An apparatus, comprising:

a display system including one or more displays;

a biometric authentication system; and control means for:

controlling the display system to present one or more restricted access virtual buttons in a secure region, the restricted access virtual buttons corresponding to functionality of the apparatus or functionality of a software application for which access is restricted;

controlling the display system to present one or more unrestricted access virtual buttons in a non-secure region, the non-secure region being displayed differently from the secure region, the unrestricted access virtual buttons corresponding to functionality of the apparatus or functionality of the software application for which access is not restricted;

responsive to the selection of a virtual button displayed in the secure region, control controlling the biometric authentication system to perform an authentication process;

execute executing the functionality of the apparatus or functionality of a software application for which access is restricted after successful authentication; and prevent executing preventing execution of the functionality of the apparatus or functionality of a software application for which access is restricted if the authentication process is not successful; and responsive to the selection of a virtual button displayed in the non-secure region, executing the functionality of the device or functionality of a software application for which access is not restricted without authentication.

17. The apparatus of claim 16, wherein the restricted access virtual buttons correspond to functionality of the apparatus or functionality of the software application for which the access is restricted when the apparatus is in a secure state or when the software application has been initialized.

18. One or more non-transitory media having instructions stored thereon for controlling an apparatus to perform a method, the method comprising:

controlling, by a control system of the apparatus, a display system of the apparatus to present one or more restricted access virtual buttons in a secure region, the restricted access virtual buttons corresponding to functionality of the apparatus or functionality of a software application for which access is restricted;

controlling, by the control system, the display system to present one or more unrestricted access virtual buttons in a non-secure region, the non-secure region being displayed differently from the secure region, the unrestricted access virtual buttons corresponding to functionality of the apparatus or functionality of the software application for which access is not restricted;

in response to the selection of a virtual button displayed in the secure region, performing an authentication process and executing the functionality of the apparatus or functionality of a software application for which access is restricted after successful authentication; and in response to the selection of a virtual button displayed in the non-secure region, executing the functionality of the device or functionality of a software application for which access is not restricted without authentication.

19. The one or more non-transitory media of claim 18, wherein the access to functionality corresponding to the restricted access virtual buttons is prevented if the authentication process is not successful.

20. The one or more non-transitory media of claim 18, wherein the secure region corresponds to a fingerprint sensor area.

* * * * *